US007596231B2

(12) United States Patent
Samadani

(10) Patent No.: US 7,596,231 B2
(45) Date of Patent: Sep. 29, 2009

(54) REDUCING NOISE IN AN AUDIO SIGNAL

(75) Inventor: Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1072 days.

(21) Appl. No.: 11/135,457

(22) Filed: May 23, 2005

(65) Prior Publication Data

US 2006/0265218 A1 Nov. 23, 2006

(51) Int. Cl.
*H04B 15/00* (2006.01)

(52) U.S. Cl. ...................... 381/94.2; 381/94.1; 704/233

(58) Field of Classification Search .................. 381/57, 381/94.1–94.4, 94.7–94.9, 71.1, 71.8–71.14; 704/226, 233

See application file for complete search history.

(56) References Cited

U.S. PATENT DOCUMENTS

| | | | | |
|---|---|---|---|---|
| 4,811,404 | A * | 3/1989 | Vilmur et al. | 381/94.3 |
| 5,285,165 | A * | 2/1994 | Renfors et al. | 327/552 |
| 5,727,072 | A * | 3/1998 | Raman | 381/94.2 |
| 6,035,048 | A | 3/2000 | Diethorn | |
| 6,098,038 | A | 8/2000 | Hermansky et al. | |
| 6,738,445 | B1 * | 5/2004 | Soulodre | 375/377 |
| 7,158,932 | B1 * | 1/2007 | Furuta | 704/226 |
| 7,203,326 | B2 * | 4/2007 | Matsuzawa et al. | 381/94.2 |
| 7,224,810 | B2 * | 5/2007 | Brown | 381/94.3 |
| 7,254,242 | B2 * | 8/2007 | Ise et al. | 381/94.3 |
| 7,480,614 | B2 * | 1/2009 | Huang | 704/233 |
| 2007/0009109 | A1 * | 1/2007 | Ise et al. | 381/94.2 |
| 2008/0101626 | A1 * | 5/2008 | Samadani | 381/94.3 |

OTHER PUBLICATIONS

Patrick J. Wolf et al, "Perceptually motivated approaches to music restoration," Journal of New Music Research, vol. 30, No. 1, pp. 83-92 (2001).

* cited by examiner

*Primary Examiner*—Xu Mei

(57) ABSTRACT

Methods, machines, systems and machine-readable instructions for processing input audio signals are described. In one aspect, an input audio signal has a noise period that includes a targeted noise signal and a noise-free period free of the targeted noise signal. The input audio signal in the noise-free period is divided into spectral time slices each having a respective spectrum. Ones of the spectral time slices of the input audio signal are selected based on the respective spectra of the spectral time slices. An output audio signal is composed for the noise period based at least in part on the selected ones of the spectral time slices of the input audio signal in the noise-free period.

33 Claims, 10 Drawing Sheets

REDUCING NOISE IN AN AUDIO SIGNAL

BACKGROUND

Many audio recordings are made in noisy environments. The presence of noise in audio recordings reduces their enjoyability and their intelligibility. Noise reduction algorithms are used to suppress background noise and improve the perceptual quality and intelligibility of audio recordings. Spectral attenuation is a common technique for removing noise from audio signals. Spectral attenuation involves applying a function of an estimate of the magnitude or power spectrum of the noise to the magnitude or power spectrum of the recorded audio signal. Another common noise reduction method involves minimizing the mean square error of the time domain reconstruction of an estimate of the audio recording for the case of zero-mean additive noise.

In general, these noise reduction methods tend to work well for audio signals that have high signal-to-noise ratios and low noise variability, but they tend to work poorly for audio signals that have low signal-to-noise ratios and high noise variability. What is needed is a noise reduction approach that yields good noise reduction results even when the audio signals have low signal-to-noise ratios and the noise content has high variability.

SUMMARY

In one aspect, the invention features a method of processing an input audio signal having a noise period comprising a targeted noise signal and a noise-free period free of the targeted noise signal. In accordance with this inventive method, the input audio signal in the noise-free period is divided into spectral time slices each having a respective spectrum. Ones of the spectral time slices of the input audio signal are selected based on the respective spectra of the spectral time slices. An output audio signal is composed for the noise period based at least in part on the selected ones of the spectral time slices of the input audio signal in the noise-free period.

The invention also features a machine, a system, and machine-readable instructions for implementing the above-described input audio signal processing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. OVERVIEW

The embodiments that are described in detail below enable substantial reduction of a targeted noise signal in a noise period of an input audio signal. These embodiments leverage audio information that is contained in a noise-free period of the input audio signal, which is free of the targeted noise signal, to compose an output audio signal for the noise period. In some implementations, at least a portion of the output audio signal is composed from audio information that is contained in both the noise-free period and the noise period. The output audio signals that are composed by these implementations contain substantially reduced levels of the targeted noise signal and, in some cases, substantially preserve desirable portions of the original input audio signal in the noise period that are free of the targeted noise signal.

Figure 1:
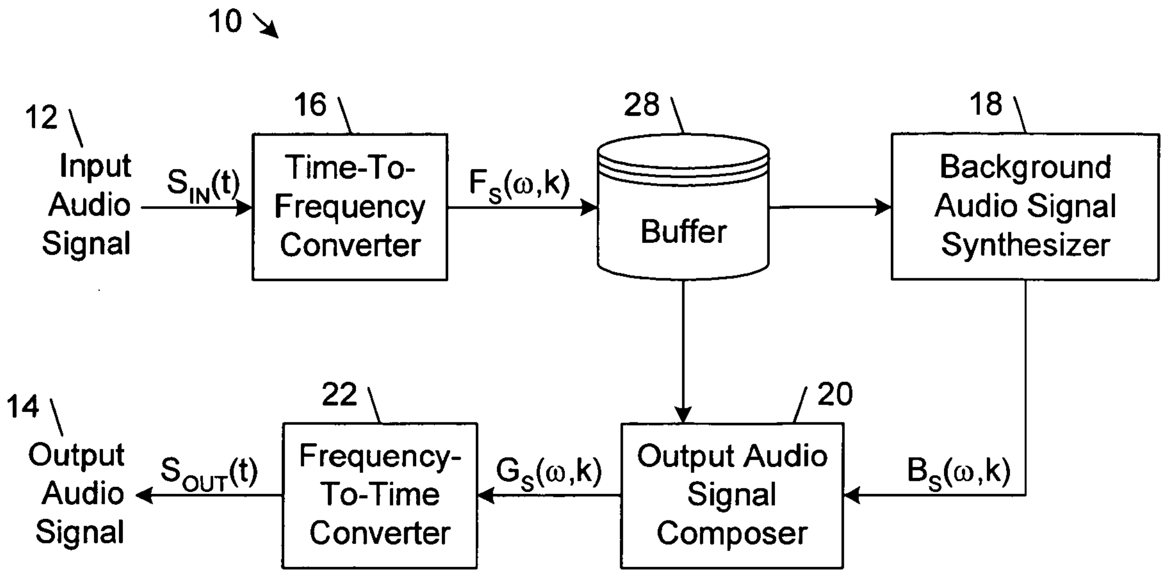
FIG. 1 is a block diagram of an embodiment of a system for reducing noise in an input audio signal.

FIG. 1 shows an embodiment of a noise reduction system 10 for processing an input audio signal 12 ($S_{IN}(t)$), which includes a targeted noise signal, to produce an output audio signal 14 ($S_{OUT}(t)$) in which the targeted noise signal is substantially reduced. In the illustrated embodiments, the input audio signal 12 has a noise period that includes the targeted noise signal and a noise-free period that is adjacent to the noise period and is free of the targeted noise signal.

The noise reduction system 10 includes a time-to-frequency converter 16, a background audio signal synthesizer 18, an output audio signal composer 20, and a frequency-to-time converter 22. The time-to-frequency converter 16, the background audio signal synthesizer 18, the output audio signal composer 20, and the frequency-to-time converter 22 may be implemented in any computing or processing environment, including in digital electronic circuitry or in computer hardware, firmware, or software. In some embodiments, the time-to-frequency converter 16, the background audio signal synthesizer 18, the output audio signal composer 20, and the frequency-to-time converter 22 are implemented by one or more software modules that are executed on a computer. Computer process instructions for implementing the time-to-frequency converter 16, the background audio signal synthesizer 18, the output audio signal composer 20, and the frequency-to-time converter 22 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

In the following description, it is assumed that at any given period, the input audio signal 12 may contain one or more of the following elements: a structured signal (e.g., a signal corresponding to speech or music) that is sensitive to distortions; an unstructured signal (e.g., a signal corresponding to the sounds of waves or waterfalls) that is part of the signal to be retained but may be modified or synthesized without compromising the intelligibility of the input audio signal 12; and a targeted noise signal (e.g., a signal corresponding to noise that is generated by a zoom motor of a digital still camera during video clip capture) whose levels should be reduced in the output audio signal 14.

Figure 2:
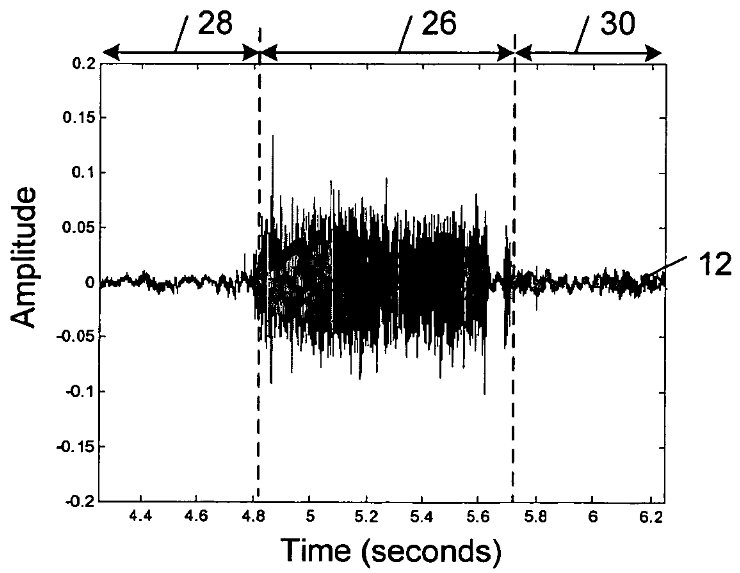
FIG. 2 is a graph of the amplitude of an exemplary input audio signal plotted as a function of time.

FIG. 2 shows a graph of the amplitude of an exemplary implementation of the input audio signal 12 plotted as a function of time. In these implementations, the input audio signal 12 includes a combination of speech signals, background music signals, and a targeted noise signal that is generated by a zoom motor of a digital video camera. The targeted noise signal only occurs during a noise period 26 of the input audio signal 12. The noise period 26 is bracketed on either side by a preceding adjacent noise-free period 28 and a subsequent adjacent noise-free period 30, each of which is free of the targeted noise signal.

II. BACKGROUND AUDIO SYNTHESIS FOR REDUCING NOISE IN AN INPUT AUDIO SIGNAL

Figure 3:
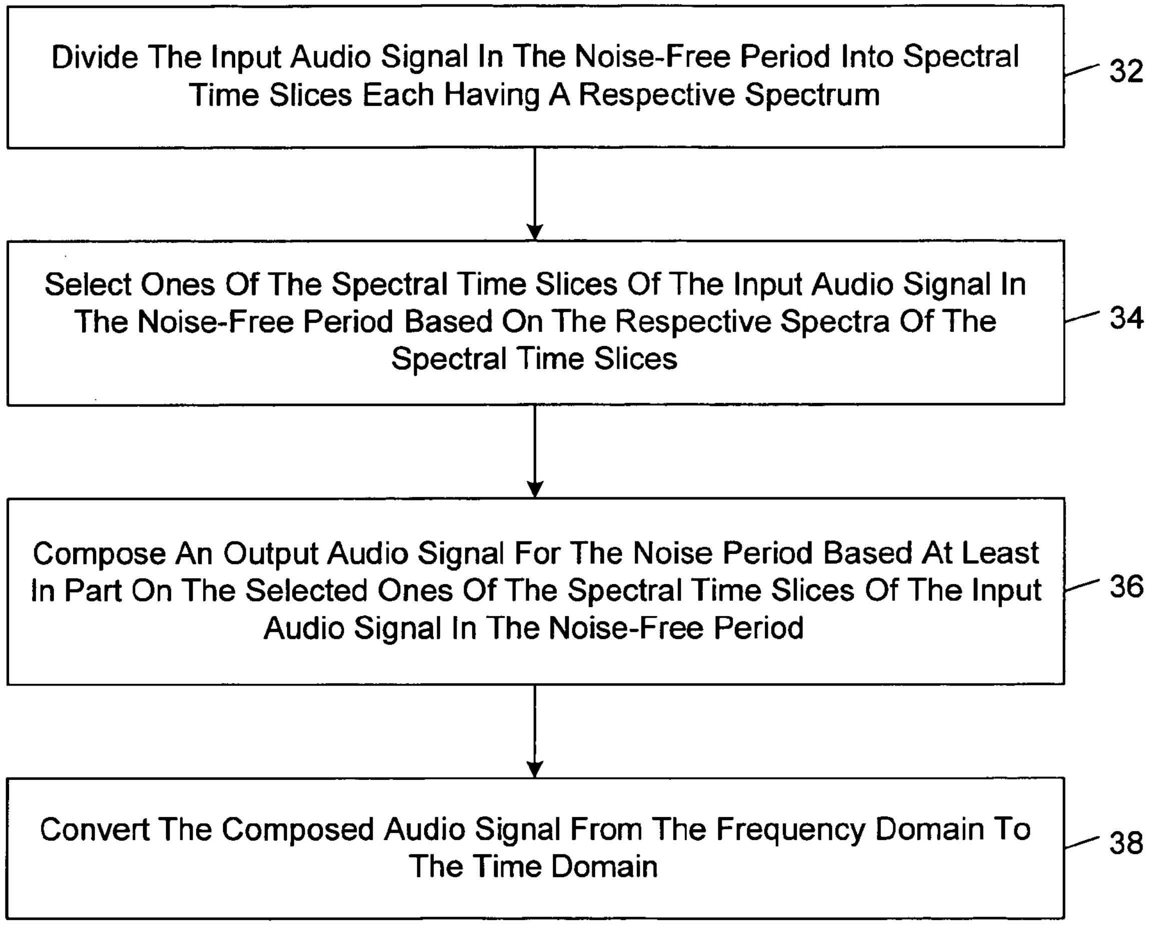
FIG. 3 is a flow diagram of an embodiment of a method of reducing noise in an input audio signal.

FIG. 3 shows a flow diagram of an embodiment of a method by which the noise reduction system 10 processes an input audio signal of the type shown in FIG. 2 to reduce a targeted noise signal in the noise period. As used herein, a noise signal is "targeted" in the sense that the noise reduction system 10 has or can obtain information about one or more of (1) the time or times when the noise signal is present in the input audio signal, and (2) a model of the noise signal. In some implementations, the model of the targeted noise signal may be generated during a calibration phase of operation and may be updated dynamically.

In accordance with this embodiment, the time-to-frequency converter 16 divides (or windows) the input audio signal 12 in the noise-free period 28 into spectral time slices each of which has a respective spectrum in the frequency domain (block 32). In some implementations, the input audio signal 12 is windowed using, for example, a 50 ms (millisecond) Hanning window and a 25 ms overlap between audio frames. Each of the windowed audio frames then is decomposed into the frequency domain using, for example, the short-time Fourier Transform (FT). In some implementations, only the magnitude spectrum is estimated.

Each of the spectra that is generated by the time-to-frequency converter 16 corresponds to a spectral time slice of the input audio signal 12 as follows. Given an audio signal $S_{IN}(n)$, where the n are discrete time indices given by multiples of the sampling period T (i.e., n= . . . , −1, 0, 1, 2, . . . corresponds to sample times . . . −T, 0, T, 2T, . . . ), then the short-time Fourier Transform is given by $F_S(\omega,k)$, where ω is the frequency parameter and k is the time index of the spectrogram. Typically k represents a time interval, corresponding to the overlap between audio frames, that is some multiple (hundreds or thousands) of n. The adjacent audio signal spectrogram buffer is given by the set $\{F_S(\omega,k)\}$ where k is an element of the set $\{k_a\}$, which corresponds to all the time indices in one of the noise-free periods 28, 30 that are adjacent to the noise period 26. A spectral time slice is $F_S(\omega,k_j)$, where $k_j$ is a single number and is an element of the set $\{k_a\}$.

Figure 4:
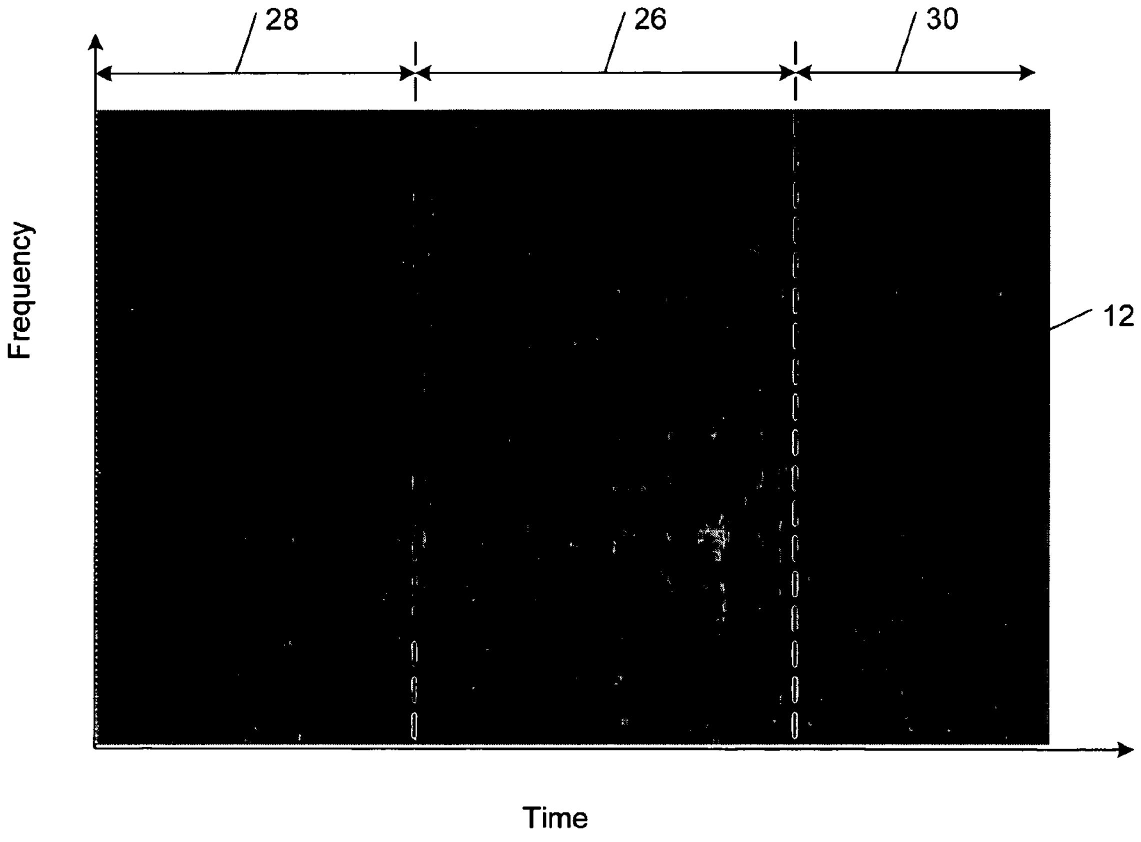
FIG. 4 is a spectrogram of an exemplary input audio signal.

The frequency domain data that is computed by the time-to-frequency converter 16 may be represented graphically by a sound spectrogram, which shows a two-dimensional representation of audio intensity, in different frequency bands, over time. FIG. 4 shows a sound spectrogram for an exemplary implementation of the input audio signal 12, where time is plotted on the horizontal axis, frequency is plotted on the vertical axis, and the color intensity is proportional to audio energy content (i.e., light colors represent higher energies and dark colors represent lower energies). The spectral time slices correspond to relatively narrow, windowed time periods of the narrowband spectrogram of the input audio signal 12.

The frequency domain data that is generated by the time-to-frequency converter 16 is stored in a random access buffer 28. The buffer 28 may be implemented by a data structure or a hardware buffer. The data structure may be tangibly embodied in any suitable storage device including non-volatile memory, magnetic disks, magneto-optical disks, and CD-ROM.

The background audio signal synthesizer 18 and the output audio signal composer 20 process the frequency domain data that is stored in the buffer 28 as follows.

The background audio signal synthesizer 18 selects ones of the spectral time slices $F_S(\omega,k_j)$ of the input audio signal 12 that are stored in the buffer 28 based on respective spectra of the spectral time slices (block 34). In this process, the background audio signal synthesizer 18 selects ones of the spectral time slices from one or both of the noise-free periods 28, 30 adjacent to the noise period 26. The background audio signal synthesizer constructs a background audio signal $\{B_S(\omega,k)\}$, where k is an element of $\{k_n\}$, the set of indices corresponding to the noise period, from the selected ones of the spectral time slices from the set $\{k_a\}$, the set of indices corresponding to the noise-free period. The background audio signal synthesizer 18 may construct the background audio signal from spectral time slices that extend across the entire frequency range. Alternatively, the input audio signal may be divided into multiple frequency bins $\omega_i$ and the background audio signal synthesizer 18 may construct the background audio signal from respective sets of spectral time slices $F_S(\omega_i,k_j)$ that are selected for each of the frequency bins.

In general, any method of selecting spectral time slices that largely correspond to unstructured audio signals may be used to select the ones of the spectral time slices from which to construct the background audio signal. In some embodiments, the background audio synthesizer 18 selects the ones of the spectral times slices of the input audio signal 12 from which to construct the background audio signal based on a parameter that characterizes the spectral content of the spectral time slices $F_S(\omega,k_j)$ in one or both of the noise-free periods 28, 30. In some implementations, the characterizing parameter corresponds to one of the vector norms $|d|_L$ given by the general expression:

$$|d|_L \equiv \left(\sum_i |d_i|^L\right)^{\frac{1}{L}} \tag{1}$$

where the $d_i$ correspond to the spectral coefficients for the frequency bins $\omega_i$ and L corresponds to a positive integer that specifies the type of vector norm. The vector norm for L=1 typically is referred to as the L1-norm and the vector norm for L=2 typically is referred to as the L2-norm.

After the vector norm values have been computed for each of the spectral time slices in the noise-free period, the background audio signal synthesizer 18 selects ones of the spectral time slices based on the distribution of the computed vector norm values. In general, the background audio signal synthesizer 18 may select the spectral time slices using any selection method that is likely to yield a set of spectral time slices that largely corresponds to unstructured background noise signals. In some implementations, the background signal synthesizer 18 infers that spectral time slices having relatively low vector norm values are likely to have a large amount of unstructured background noise content. To this end, the background signal synthesizer 18 selects the spectral time slices that fall within a lowest portion of the vector norm distribution. The selected time slices may correspond to a lowest predetermined percentile of the vector norm distribution or they may correspond to a predetermined number of spectral time slices having the lowest vector norm values.

In some implementations, the background audio signal synthesizer 18 constructs (or synthesizes) the background audio signal $B_S(\omega,k)$ from the selected ones of the spectral time slices. In some implementations, the background audio signal synthesizer 18 synthesizes the background audio signal by pseudo-randomly sampling the selected ones of the spectral time slices over a time period corresponding to the duration of the noise period 26. In this way, the background audio signal $B_S(\omega,k)$ corresponds to a set of spectral time slices that is pseudo-randomly selected from the set of the spectral time slices that was selected from one or both of the noise-free periods 28, 30.

The output audio signal composer 20 composes an output audio signal for the noise period 26 based at least in part on the ones of the spectral time slices of the input audio signal 12 that were selected by the background audio signal synthesizer 18 (block 36). In some implementations, the output audio signal composer 20 replaces the input audio signal 12 in the noise period 26 with the synthesized background audio signal $B_S(\omega,k)$. In these implementations, the noise-free periods 28, 30 of the resulting output audio signal $G_S(\omega,k)$ correspond exactly to the noise-free periods of the input audio signal $F_S(\omega,k)$, whereas the noise period 26 of the output audio signal $G_S(\omega,k)$ corresponds to the background audio signal $B_S(\omega,k)$.

Figure 5:
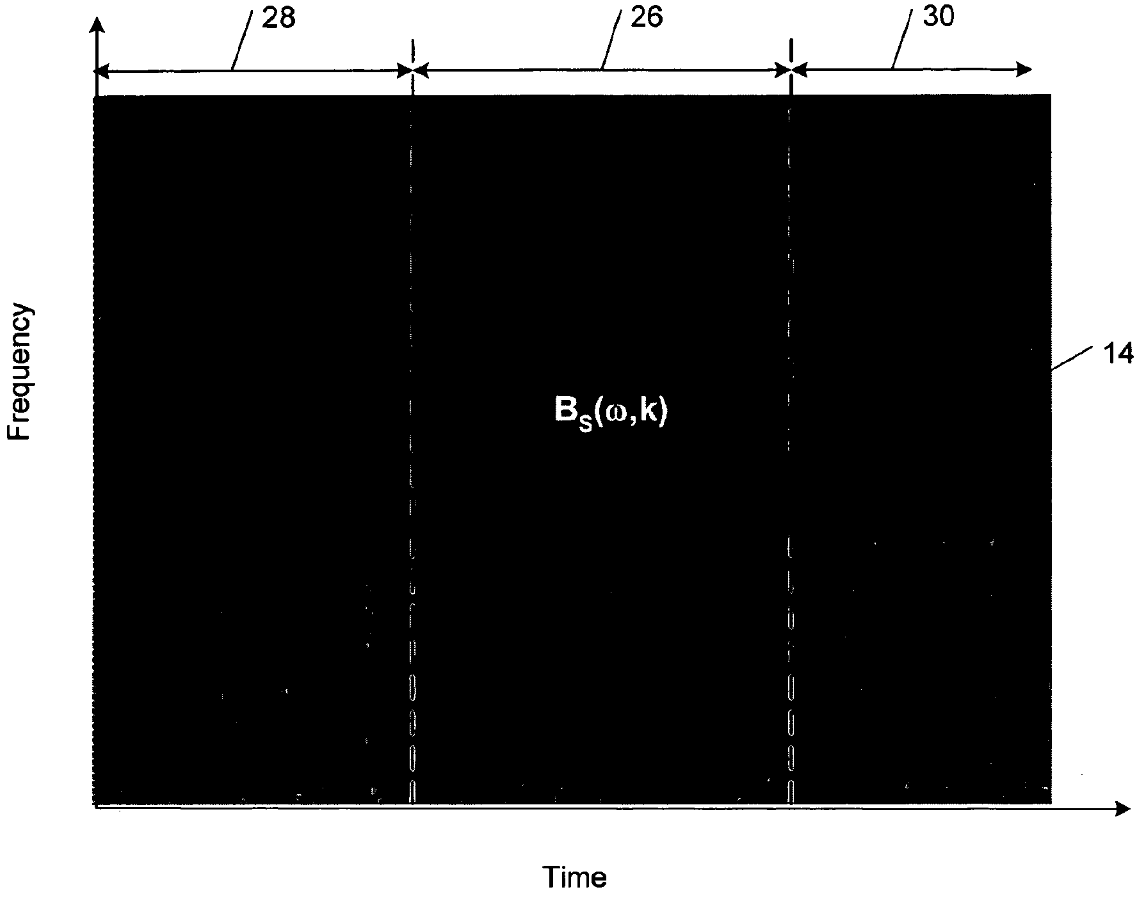
FIG. 5 is a spectrogram of an output audio signal composed from the input audio signal shown in FIG. 4 in accordance with the method of FIG. 3.

FIG. 5 shows an exemplary spectrogram of the output audio signal $G_S(\omega,k)$ in which the noise period 26 corresponds to the background audio signal $B_S(\omega,k)$. By comparing the spectrograms shown in FIGS. 4 and 5, it can be seen that the zoom motor noise in the noise period 26 of the output audio signal $G_S(\omega,k)$ is substantially reduced relative the zoom motor noise in the noise period 26 of the original input audio signal 12.

Referring back to FIGS. 1 and 3, the frequency-to-time converter 22 converts the output audio signal $G_S(\omega,k)$ into the time domain to generate the output audio signal 14 ($S_{OUT}(t)$) (block 38). In this process, the frequency-to-time converter 22 composes the spectral time slices of the output audio signal $G_S(\omega,k)$ into the time domain using, for example, the Inverse Fourier Transform (IFT).

III. COMBINING SYNTHESIZED BACKGROUND AUDIO AND NOISE-ATTENUATED AUDIO TO REDUCE NOISE IN AN INPUT AUDIO SIGNAL

In some implementations, the noise reduction system 10 composes at least a portion of the output audio signal from audio information that is contained in at least one noise-free period and a noise period. In these implementations, audio content of a noise-free period of an input audio signal may be combined with audio content from the noise period of the input audio signal to reduce a targeted noise signal in the noise period while preserving at least some aspects of the original audio content in the noise period. In some cases, the noise period in the resulting output audio signal may be less noticeable and sound more natural.

Figure 6:
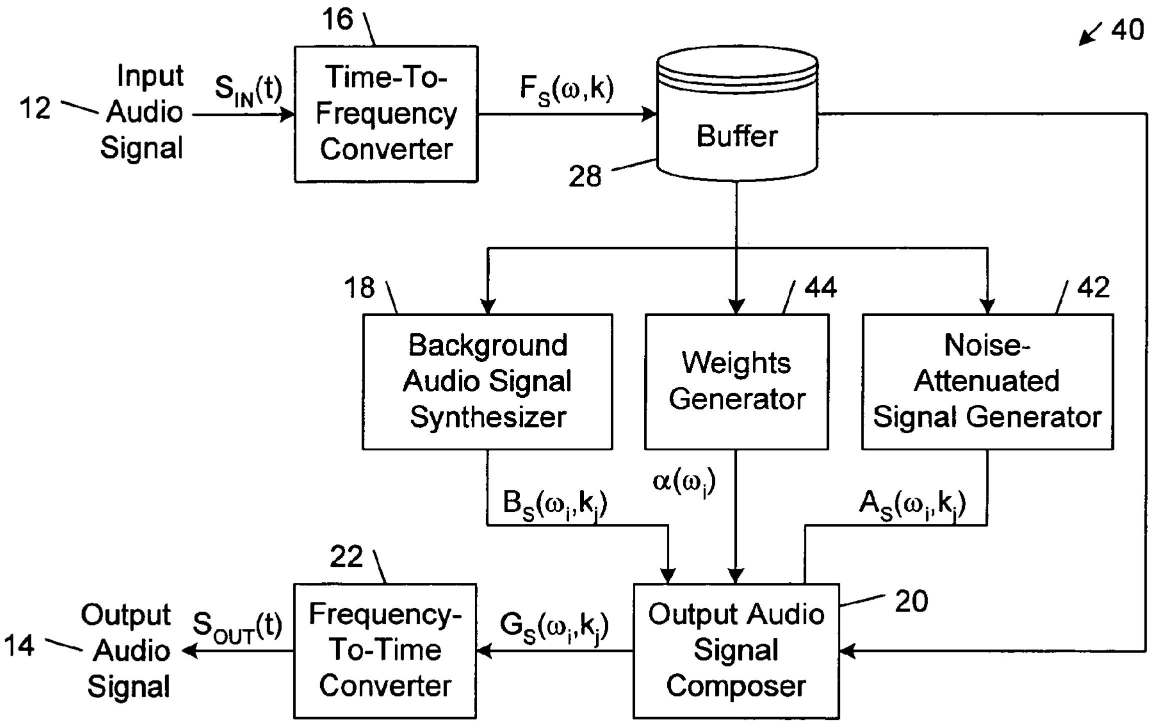
FIG. 6 is a block diagram of an implementation of the noise reduction system shown in FIG. 1.

FIG. 6 shows an implementation 40 of the noise reduction system 10 that additionally includes a noise-attenuated signal generator 42 and a weights generator 44. The noise-attenuated signal generator 42 and the weights generator 44 may be implemented in any computing or processing environment, including in digital electronic circuitry or in computer hardware, firmware, or software. In some embodiments, the noise-attenuated signal generator 42 and the weights generator 44 are implemented by one or more software modules that are executed on a computer. Computer process instructions for implementing the noise-attenuated signal generator 42 and the weights generator 44 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

Figure 7:
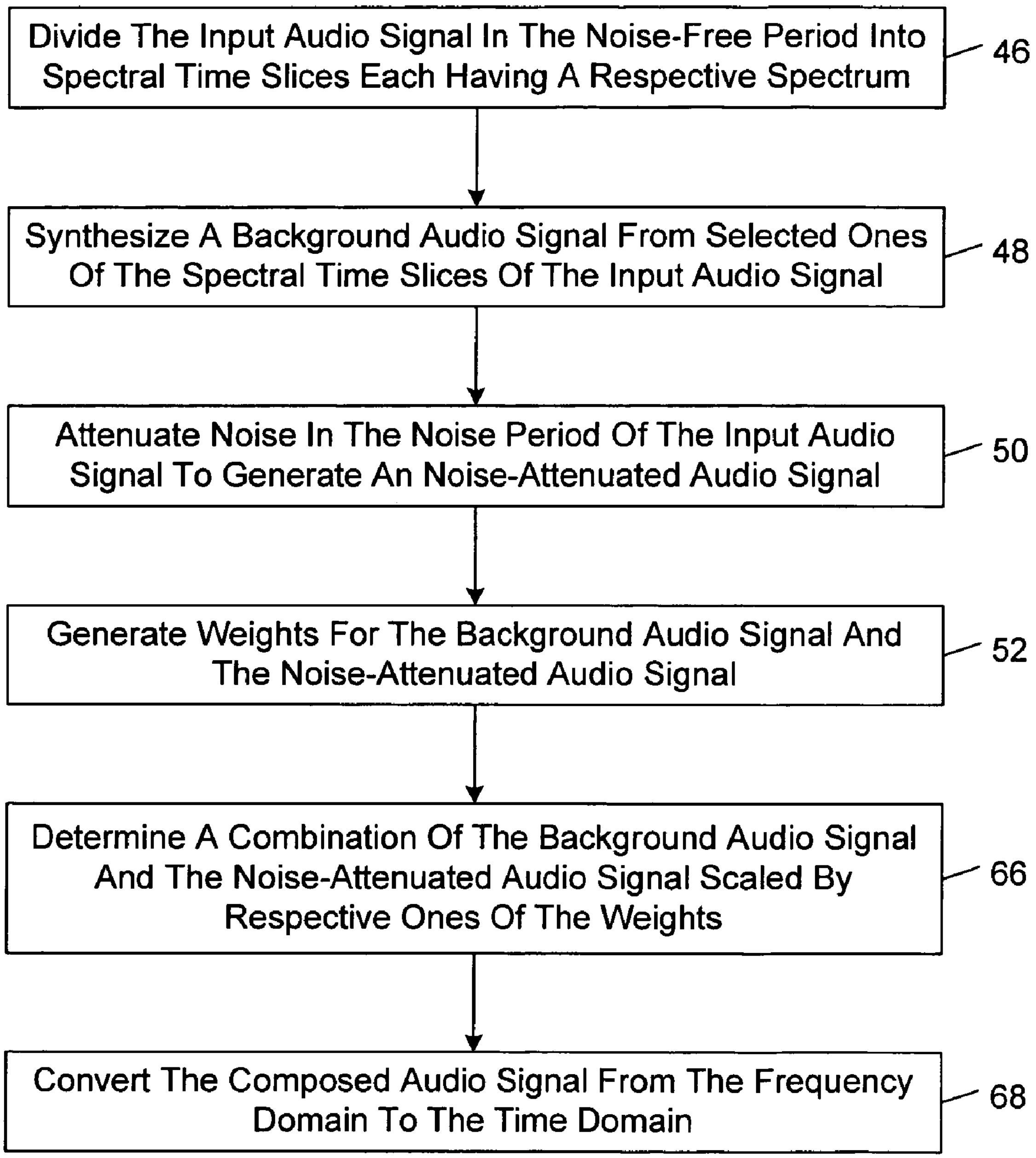
FIG. 7 is a flow diagram of an embodiment of a method of reducing noise in an input audio signal.

FIG. 7 shows a flow diagram of an embodiment of a method by which the noise reduction system implementation 40 processes an input audio signal 12 of the type shown in FIG. 2. This embodiment is able to reduce a targeted noise is signal in the noise period of the input audio signal 12 while preserving at least some desirable features in the noise period of the original input audio signal 12.

In accordance with this embodiment, the time-to-frequency converter 16 divides (or windows) the input audio signal 12 in the noise-free period into spectral time slices each of which has a respective spectrum in the frequency domain (block 46). In the implementation 40 of the noise reduction system 10, the time-to-frequency converter 16 operates in the same way as the corresponding component in the implementation described above in connection with FIG. 1.

The frequency domain data ($F_S(\omega,k)$) that is generated by the time-to-frequency converter 16 is stored in a random access buffer 28, as described above.

The background audio signal synthesizer 18 synthesizes a background audio signal ($B_S(\omega,k)$) from selected ones of the spectral time slices of the input audio signal 12 that are stored in buffer 28 (block 48). In this implementation 40 of the noise reduction system 10, the background audio signal synthesizer 18 operates in the same way as the corresponding component in the implementation described above in connection with FIG. 1.

The noise-attenuated signal generator 42 attenuates the targeted noise in the noise period of the input audio signal 12 to generate a noise-attenuated audio signal ($A_S(\omega,k)$) (block 50). In general, the noise-attenuated signal generator 42 may use any one of a wide variety of different noise reduction techniques for reducing the targeted noise signal in the noise period of the input audio signal 12, including spectral attenuation noise reduction techniques and mean-square minimization noise reduction techniques.

In one spectral attenuation based implementation, called spectral subtraction, the noise-attenuated signal generator 42 subtracts an estimate of the targeted noise signal spectrum from the input audio signal 12 spectrum in the noise period. Assuming that the targeted noise signal is uncorrelated with the other audio content in the noise period, an estimate $|A_S(\omega,$ $k)|^2$ of the power spectrum of the input audio signal 12 $F_S(\omega, k)$ in the noise period without the targeted noise signal may be given by:

$$|A_S(\omega,k)|^2=|F_S(\omega,k)|^2-|\hat{T}(\omega,k)|^2 \quad (2)$$

where $\hat{T}(\omega,k)$ is an estimate of the spectrum of the targeted noise signal. In some implementations, the spectrum of the targeted noise signal is estimated by the average of multiple instances of the targeted noise signal that are recorded in a quiet environment. For example, in implementations in which the targeted noise signal is generated by a zoom motor in a video camera, audio recordings of the zoom motor noise may be captured over multiple zoom cycles and the recorded audio signals may be averaged to obtain an estimate of the spectrum $\hat{T}(\omega,k)$ of the targeted noise signal.

Figure 8:
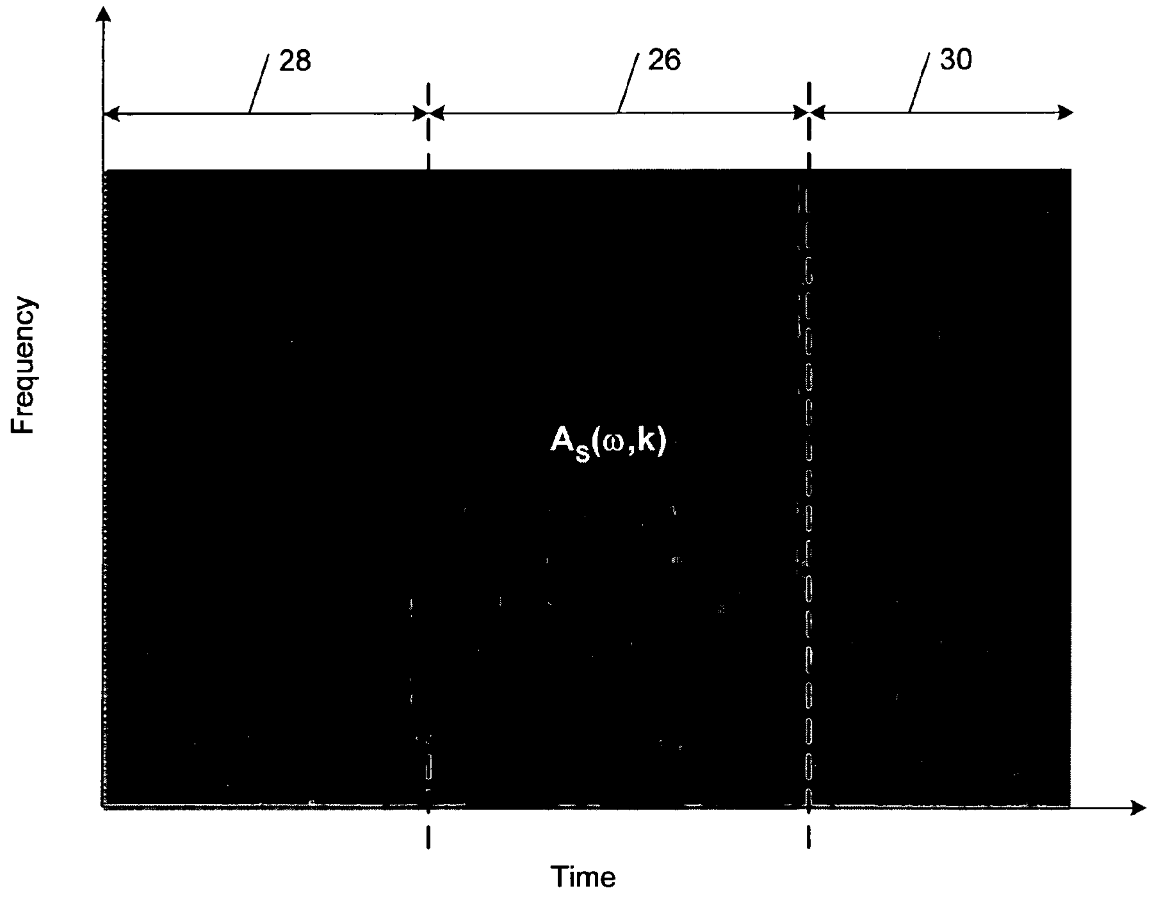
FIG. 8 is a spectrogram of a noise-attenuated audio signal generated from the input audio signal shown in FIG. 4.

FIG. 8 shows an exemplary spectrogram of the input audio signal 12 in which the noise period 26 contains the noise-attenuated audio signal $A_S(\omega,k)$. By comparing the spectrograms shown in FIGS. 4 and 8, it can be seen that the zoom motor noise in the noise period 26 of the output audio signal $G_S(\omega,k)$ is only slightly reduced relative the zoom motor noise in the noise period 26 of the original input audio signal 12. This is due to the fact that the input audio signal 12 in the noise period 26 has a low signal-to-noise ratio and the targeted noise signal has a high variability. However, it is noted that the noise-attenuated audio signal $A_S(\omega,k)$ also contains some structured and unstructured audio content that was present in the original input audio signal 12.

Referring back to FIGS. 6 and 7, the weights generator 44 generates the weights $\alpha(\omega_i,k_j)$ for combining the background audio signal $B_S(\omega_i,k_j)$ and the noise-attenuated audio signal $A_S(\omega_i,k_j)$ (block 52). Weights are generated for each of multiple frequency bins $\omega_i$ of the input audio signal 12. The weights generator 44 generates weights based partially on the audio content of one or both of the noise-free periods 28, 30 that are adjacent to the noise period 26. The weights generator 44 may also generate weights based partially on the audio content of the noise period 26. In general, the weights are set so that the contribution from the background audio signal $B_S(\omega_i,k_j)$ increases relative to the contribution of the noise-attenuated audio signal $A_S(\omega_i,k_j)$ when the audio content in one or both of the noise-free periods 28, 30 is determined to be unstructured. Conversely, the weights are set so that the contribution from the background audio signal $B_S(\omega_i,k_j)$ decreases relative to the contribution of the noise-attenuated audio signal $A_S(\omega_i,k_j)$ when the audio content in one or both of the noise-free periods 28, 30 is determined to be structured.

In some implementations, the weights $\alpha(\omega_i)$ are used to scale a linear combination of the synthesized background audio signal and the noise-attenuated audio signal. In these implementations, the weights generator 44 computes the values of the weights based on the spectral energy of the input audio signal in the noise-free period relative to the spectral energy of the targeted noise signal in the noise period. In one implementation, the weights, as a function of frequency bin $\omega_i$, are computed in accordance with equation (3):

$$\alpha(\omega_i)=\frac{\|\tau(\omega_i)\|^2}{\|\tau(\omega_i)\|^2+\|\Im(\omega_i)\|^2} \quad (3)$$

where $\|\tau(\omega_i)\|^2$ is the time-integrated relative energy of $\|\hat{T}(\omega_i,k_j)\|$ for the targeted noise signal (normalized to sum to 1) and $\|\Im(\omega_i)\|^2$ is the time-integrated relative energy of $\|F_S(\omega_i,k_j)\|$ for the noise-free period (normalized to sum to 1).

After the background audio signal $B_S(k_j)$, the noise-attenuated audio signal $A_S(\omega_i,k_j)$, and the weights $\alpha(\omega_i)$ have been generated (blocks 48, 50, 52), the output audio signal composer 20 determines a combination of the background audio spectrum $B_S(\omega_i,k)$ and the noise-attenuated audio spectrum $A_S(\omega_i,k)$ scaled by respective ones of the weights $\alpha(\omega_i)$ (block 66). In this process, the background audio signal and the noise-attenuated audio signal are selectively combined in each of the frequency bins $\omega_i$ in the noise period 26 of the input audio signal 12. The background audio signal and the noise-attenuated audio signal may be combined in any one of a wide variety of ways.

In some implementations, the contribution of the background audio signal is increased when the audio content in the corresponding portion of the noise-free period is determined to be unstructured, and the contribution of the noise-attenuated audio signal is increased when the audio content in the corresponding portion of the noise-free period is determined to be structured.

In some implementations, the output audio signal composer 20 generates the output audio signal $G_S(\omega_i,k)$ in frequency bin $\omega_i$ in accordance with the linear combination given by equation (5):

$$G_S(\omega_i,k)=\alpha(\omega_i)\cdot B_S(\omega_i,k)+(1-\alpha(\omega_i))\cdot A_S(\omega_i,k) \quad (4)$$

where $0\leqq\alpha(\omega_i)\leqq 1$.

After the combination of the background audio signal and the non-attenuated audio signal has been determined (block 66), the frequency-to-time converter 22 converts the output audio signal spectrum $G_S(\omega,k)$ into the time domain to generate the output audio signal 14 ($S_{OUT}(t)$) (block 68). In this process, the frequency-to-time converter 22 converts the spectral time slices of the output audio signal $G_S(\omega,k)$ into the time domain using, for example, the Inverse Fourier Transform (IFT).

Figure 9:
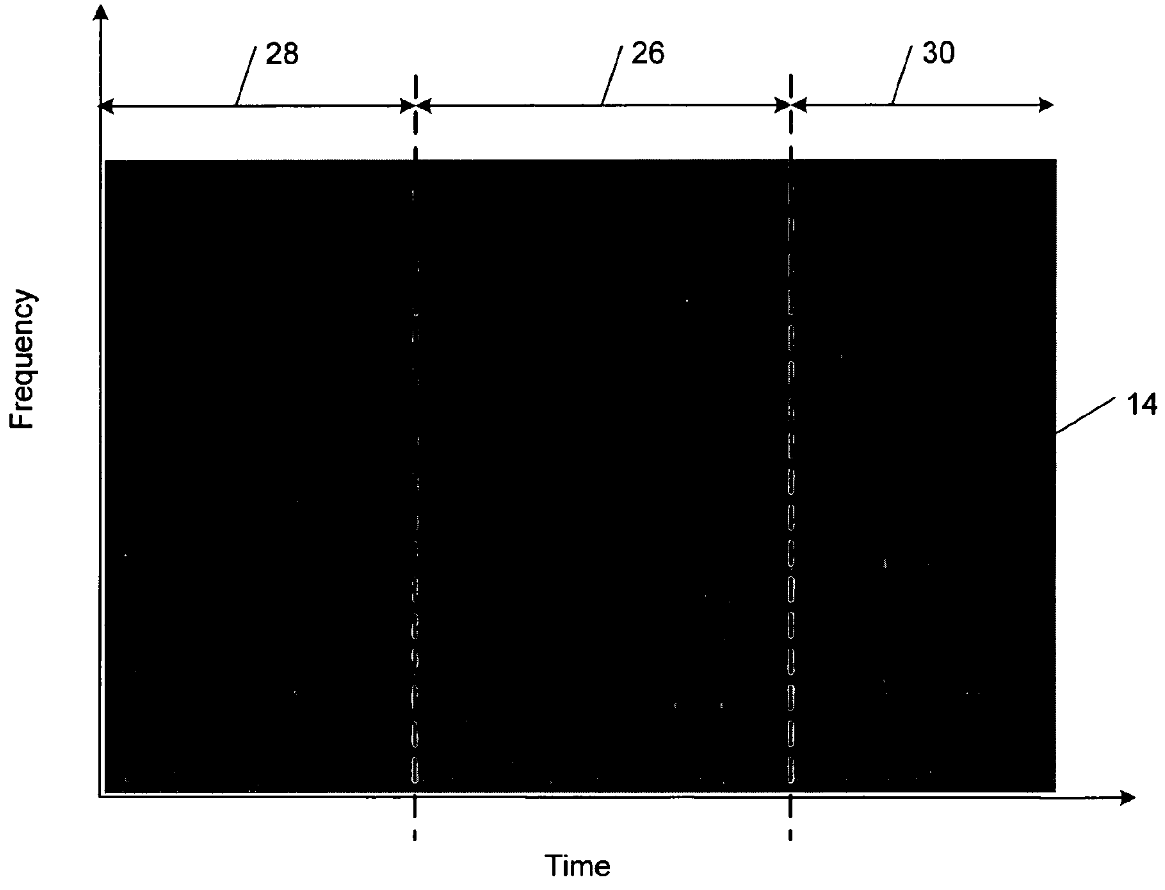
FIG. 9 is a spectrogram of an output audio signal composed from a combination the background audio signal shown in FIG. 5 and the noise-attenuated audio signal shown in FIG. 8 in accordance with the method of FIG. 7.

FIG. 9 shows a spectrogram of an output audio signal composed from a combination the background audio signal shown in FIG. 5 and the noise-attenuated audio signal shown in FIG. 8 in accordance with the method of FIG. 7. By comparing the spectrograms shown in FIGS. 4 and 9, it can be seen that the zoom motor noise in the noise period 26 of the output audio signal $G_S(\omega,k)$ is substantially reduced relative the zoom motor noise in the noise period 26 of the original input audio signal 12. In addition, by comparing FIGS. 5 and 9, the noise reduction method of FIG. 7 preserves at least some aspects of the original audio content in the noise period. In this way, the noise period in the resulting output audio signal may be less noticeable and sound more natural.

Figure 10:
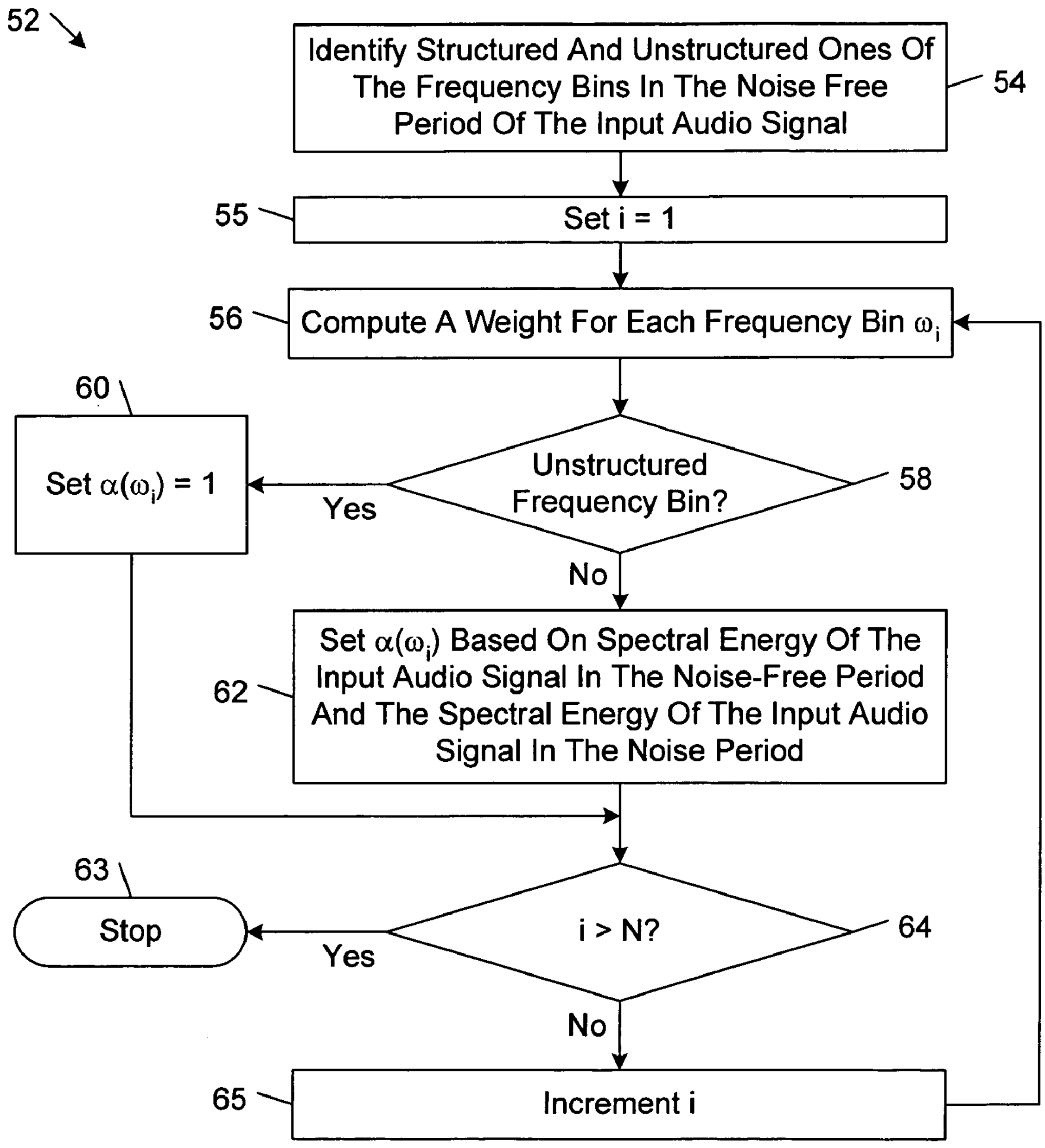
FIG. 10 is a flow diagram of an embodiment of a method of generating weights for combining a background audio signal and a noise-attenuated audio signal.

FIG. 10 shows another embodiment of a method of generating the weights $\alpha(\omega_i)$ in block 52 of FIG. 7. In accordance with this embodiment, the weights generator 44 identifies structured ones of the frequency bins in the noise-free period and unstructured ones of the frequency bins in the noise-free period (block 54). In some implementations, the weights generator 44 performs a randomness test (e.g., a runs test) on the spectral coefficients $F_S(\omega_i,k_j)$ across the spectral time slices $k_j$ in the noise-free period in each of the frequency bins $\omega_i$. If the spectral coefficients $F_S(\omega_i,k_j)$ in a particular bin $\omega_b$ are determined to be randomly distributed across the noise-free period, the weights generator 44 labels the bin $\omega_b$ as an unstructured bin. If the spectral coefficients in the bin $\omega_b$ are determined to be not randomly distributed across the noise-free period, the weights generator 44 labels the bin $\omega_b$ as a structured bin.

The indexing parameter i initially is set to 1 (block 55).

The weights generator 44 computes a weight $\alpha(\omega_i)$ for each frequency bin $\omega_i$ (block 56). If the frequency bin $\omega_i$ is unstructured (block 58), the corresponding weight $\alpha(\omega_i)$ is set to 1 (block 60). If the frequency bin $\omega_i$ is structured (block 58), the corresponding weight $\alpha(\omega_i)$ is set based on the spectral energy of the input audio signal in the noise-free period and the spectral energy of the input audio signal in the noise period (block 62). In some implementations, the weights generator 44 computes the values of the weights for the structured ones of the frequency bins $\omega_i$ in accordance with equation (3) above.

The weights computation process stops (block 63) after a respective weight $\alpha(\omega_i)$ has been computed for each of the N frequency bins $\omega_i$ (blocks 64 and 65).

IV. CAMERA SYSTEM INCORPORATING A NOISE REDUCTION SYSTEM

In general, the above-described noise reduction systems may be incorporated into any type of apparatus that is capable of recording or playing audio content.

Figure 11:
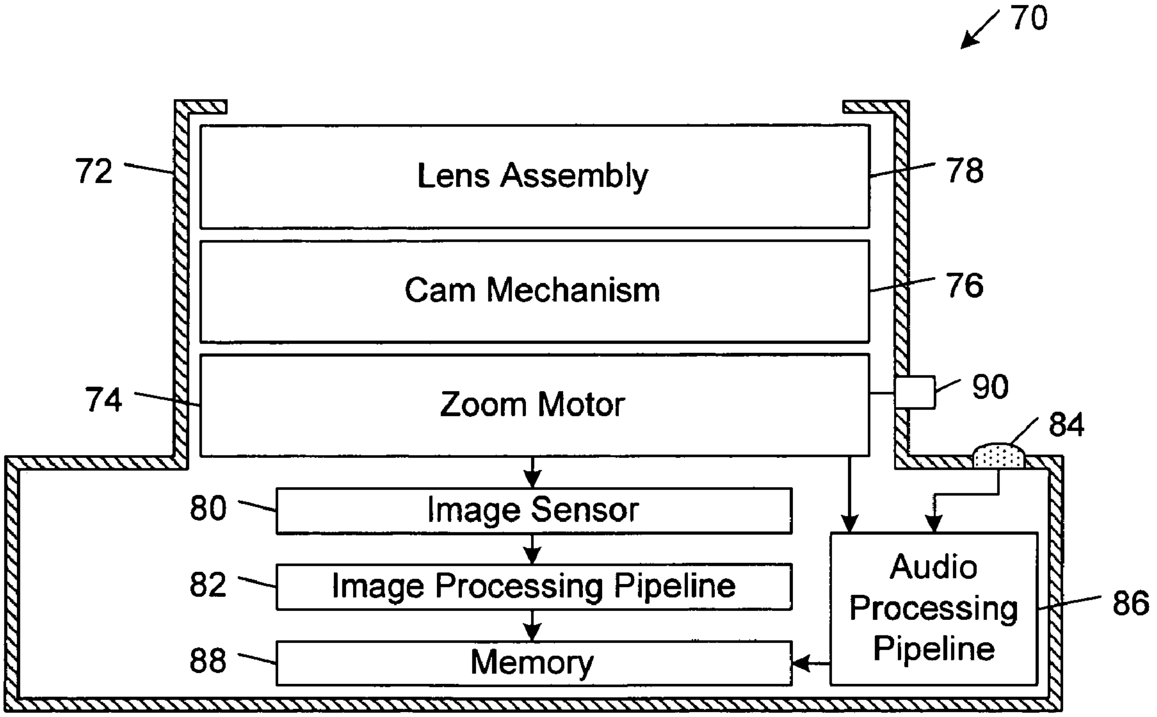
FIG. 11 is a block diagram of an embodiment of a camera system that incorporates a system for reducing a targeted zoom motor noise signal in an input audio signal.

FIG. 11 shows an embodiment of a camera system 70 that includes a camera body 72 that contains a zoom motor 74, a cam mechanism 76, a lens assembly 78, an image sensor 80, an image processing pipeline 82, a microphone 84, an audio processing pipeline 86, and a memory 88. The camera system 70 may be, for example, a digital or analog still image camera or a digital or analog video camera.

The image sensor 80 may be any type of image sensor, including a CCD image sensor or a CMOS image sensor. The zoom motor 74 may correspond to any one of a wide variety of different types of drivers that is configured to rotate the cam mechanism about an axis. The cam mechanism 76 may correspond to any one of a wide variety of different types of cam mechanisms that are configured to translate rotational movements into linear movements. The lens assembly 78 may include one or more lenses whose focus is adjusted in response to movement of the cam mechanism 76. The image processing system 84 processes the images that are captured by the image sensor 80 in any one of a wide variety of different ways.

The audio processing pipeline 86 processes the audio signals that are generated by the microphone 84. The audio processing pipeline 86 incorporates one or more of the noise reduction systems described above. In the illustrated embodiment, the audio processing pipeline 86 is configured to reduce a targeted noise signal corresponding to the noise produced by the zoom motor 74. In one implementation, the spectrum $\hat{T}(\omega,k)$ of the targeted zoom motor noise signal is estimated by capturing audio recordings of the zoom motor noise over multiple zoom cycles and averaging the recorded audio signals.

In some implementations, the audio processing pipeline identifies the noise periods in the audio signals that are generated by the microphone 84 based on the receipt of one or more signals indicating that the zoom motor 74 is operating (e.g., signal indicating the engagement and release of a switch 90 for the optical zoom motor 74). In some implementations, the audio processing pipeline 86 receives signals from the zoom motor 74 indicating the relative position of the lens assembly in the optical zoom cycle. In these implementations, the audio processing pipeline 86 maps the current position of the lens assembly to the corresponding location in the estimated spectrum $\hat{T}(\omega,k)$ of the targeted zoom motor noise signal. The audio processing pipeline 86 then uses the mapped portion of the estimated spectrum $\hat{T}(\omega,k)$ to reduce noise during the identified noise periods in the input audio signal received from the microphone in accordance with an implementation of the method of FIG. 7. In this way, the audio processing pipeline 86 is able to reduce the targeted zoom motor noise signal in the noise period of the input audio signal using a more accurate estimate of the targeted zoom motor noise signal.

V. CONCLUSION

The embodiments that are described above enable substantial reduction of a targeted noise signal in a noise period of an input audio signal. These embodiments leverage audio information contained in a noise-free period of the input audio signal that is free of the targeted noise signal to compose an output audio signal for the noise period. In some implementations, at least a portion of the output audio signal is composed from audio information that is contained in both the noise-free period and the noise period. The output audio signals that are composed by these implementations contain substantially reduced levels of the targeted noise signal and, in some cases, substantially preserve desirable portions of the original input audio signal in the noise period that are free of the targeted noise signal.

Other embodiments are within the scope of the claims.

What is claimed is:

1. A method of processing an input audio signal having a noise period comprising a targeted noise signal and a noise-free period free of the targeted noise signal, comprising:

dividing the input audio signal in the noise-free period into spectral time slices each having a respective spectrum;

selecting ones of the spectral time slices of the input audio signal based on the respective spectra of the spectral time slices; and composing an output audio signal for the noise period based at least in part on the selected ones of the spectral time slices of the input audio signal in the noise-free period.

2. The method of claim 1, wherein the selecting comprises computing respective vector norm values for the spectral time slices and selecting ones of the spectral time slices based on the computed vector norm values.

3. The method of claim 2, wherein the selecting comprises selecting ones of the spectral time slices for each of multiple frequency bins of the input audio signal in the noise-free period.

4. The method of claim 1, further comprising synthesizing a background audio signal from the selected ones of the spectral times slices.

5. The method of claim 4, wherein the synthesizing comprises pseudo-randomly sampling the selected ones of the spectral time slices to construct the background audio signal.

6. The method of claim 1, further comprising attenuating noise in the input audio signal in the noise period to generate a noise-attenuated audio signal.

7. The method of claim 6, wherein the attenuating comprises subtracting an estimate of the noise from the input audio signal in the noise period.

8. The method of claim 7, further comprising synthesizing a background audio signal from the selected spectral time slices of the input audio signal in the noise-free period.

9. The method of claim 8, wherein the composing comprises computing the output audio signal from the background audio signal and the noise-attenuated audio signal.

10. The method of claim 9, wherein the composing comprises selectively combining the background audio signal and the noise-attenuated audio signals in each of multiple frequency bins of the input audio signal in the noise period.

11. The method of claim 10, wherein the combining comprises determining a combination of the background audio signal and the noise-attenuated audio signal scaled by respective weights.

12. The method of claim 11, wherein the combining comprises determining values of the weights for the background audio signal and the noise-attenuated audio signal in each of the frequency bins.

13. The method of claim 12, wherein the determining of the weights is based on spectral energy of the input audio signal in the noise-free period and spectral energy of the input audio signal in the noise period.

14. The method of claim 12, wherein the combining comprises identifying structured ones of the frequency bins in the noise-free period comprising structured audio content and unstructured ones of the frequency bins in the noise-free period comprising unstructured audio content.

15. The method of claim 14, wherein the identifying comprises performing a randomness test on spectral coefficients of the input audio signal in the noise-free period to determine the structured and unstructured ones of the frequency bins.

16. The method of claim 14, wherein the combining comprises setting the weight of the background audio signal to a higher value than the weight of the noise-attenuated audio signal for the unstructured ones of the frequency bins.

17. The method of claim 1, further comprising identifying the noise period and the noise-free period of the input audio signal.

18. The method of claim 17, wherein the identifying comprises receiving signals demarcating beginning and ending times of the noise period.

19. The method of claim 18, wherein the input audio signal is generated by a microphone of a camera system, and the receiving comprises receiving signals indicating operation of a zoom motor for a lens assembly of the camera system.

20. The method of claim 18, wherein the input audio signal is generated by a microphone of a camera system, and the receiving comprises receiving signals indicating position of a lens assembly in the camera system.

21. A machine for processing an input audio signal having a noise period comprising a targeted noise signal and a noise-free period free of the targeted noise signal, comprising:

- a time-to-frequency converter operable to divide the input audio signal in the noise-free period into spectral time slices each having a respective spectrum;
- a background audio signal synthesizer operable to select ones of the spectral time slices of the input audio signal based on the respective spectra of the spectral time slices; and
- an output audio signal composer operable to compose an output audio signal for the noise period based at least in part on the selected ones of the spectral time slices of the input audio signal in the noise-free period.

22. The machine of claim 21, wherein the background audio signal synthesizer is operable to compute respective vector norm values for the spectral time slices and selecting ones of the spectral time slices based on the computed vector norm values.

23. The machine of claim 21, wherein the background audio signal synthesizer is operable to synthesize a background audio signal from the selected ones of the spectral times slices.

24. The machine of claim 23, further comprising a noise-attenuated signal generator operable to attenuate noise in the input audio signal in the noise period to generate a noise-attenuated audio signal.

25. The machine of claim 24, wherein the output audio signal composer is operable to compute the output audio signal from the background audio signal and the noise-attenuated audio signal.

26. The machine of claim 25, wherein the output audio signal composer is operable to selectively combine the background audio signal and the noise-attenuated audio signals in each of multiple frequency bins of the input audio signal in the noise period.

27. The machine of claim 26, wherein the output audio signal composer is operable to determine a combination of the background audio signal and the noise-attenuated audio signal scaled by respective weights.

28. The machine of claim 21, further comprising an audio signal processing pipeline incorporating the background audio signal synthesizer, the noise-attenuated signal generator, and the output audio signal composer, wherein the audio signal processing pipeline is operable to identify the noise period and the noise-free period of the input audio signal.

29. The machine of claim 28, wherein the audio signal processing pipeline receives signals demarcating beginning and ending times of the noise period.

30. The machine of claim 29, further comprising a lens assembly, a zoom motor, and a microphone of a camera system, wherein the audio signal processing pipeline receives signals indicating operation of the zoom motor and is operable to reduce zoom motor noise in audio signals generated by the microphone based on the received signals.

31. The machine of claim 29, wherein the audio signal processing pipeline receives signals indicating position of the lens assembly and is operable to reduce zoom motor noise in audio signals generated by the microphone based on the received signals.

32. A machine-readable medium storing machine-readable instructions for processing an input audio signal having a noise period comprising a targeted noise signal and a noise-free period free of the targeted noise signal, the machine-readable instructions causing a machine to perform operations comprising:

- dividing the input audio signal in the noise-free period into spectral time slices each having a respective spectrum;
- selecting ones of the spectral time slices of the input audio signal based on the respective spectra of the spectral time slices; and
- composing an output audio signal for the noise period based at least in part on the selected ones of the spectral time slices of the input audio signal in the noise-free period.

33. A system for processing an input audio signal having a noise period comprising a targeted noise signal and a noise-free period free of the targeted noise signal, comprising:

- means for dividing the input audio signal in the noise-free period into spectral time slices each having a respective spectrum;
- means for selecting ones of the spectral time slices of the input audio signal based on the respective spectra of the spectral time slices; and
- means for composing an output audio signal for the noise period based at least in part on the selected ones of the spectral time slices of the input audio signal in the noise-free period.

* * * * *